United States Patent

[11] 3,572,480

| [72] | Inventor | William S. Nagel<br>Franklin, Mich. (3135 Spring Court, Birminghan, Mich., 48010) |
|---|---|---|
| [21] | Appl. No. | 815,733 |
| [22] | Filed | Apr. 14, 1969 |
| [45] | Patented | Mar. 30, 1971 |

[54] TRANSMISSION-DRIVEN RETARDER WITH FLUID-OPERATED BLOCKER AND INLET VALVE
11 Claims, 10 Drawing Figs.

[52] U.S. Cl. .................................................. 192/4B,
188/90A, 60/54
[51] Int. Cl. ........................................................ F16h 57/10,
F16d 57/02
[50] Field of Search ........................................ 192/4 (B);
188/90 (A)

[56] References Cited
UNITED STATES PATENTS

| 2,267,852 | 12/1941 | Walker | 188/90A |
|---|---|---|---|
| 2,737,276 | 3/1956 | Wyndham | 188/90X |
| 2,827,989 | 3/1958 | Christenson | 192/4B |
| 3,103,997 | 9/1963 | Shealey et al. | 192/4B |
| 3,270,838 | 9/1966 | Schweizer | 188/90A |
| 3,291,268 | 12/1966 | Nagel | 192/4B |

*Primary Examiner*—Benjamin W. Wyche
*Attorney*—Woodhams, Blanchard and Flynn

ABSTRACT: A device for retarding the speed of a motor vehicle having an engine cooling system, ground engaging wheels and a transmission including a housing and gears normally shiftable into high ratios at low vehicle speeds and low ratios at high vehicle speeds and having a power takeoff connection to said transmission at a point having at least a pair of ratio gears between the power takeoff and the output shaft of said transmission. An impeller housing is connected to said cooling system for receiving energy absorbing medium therefrom, and has a stator fixed thereto and an impeller rotatably concentrically mounted therewithin. Said rotor is preferably secured to the power takeoff and is driven thereby. A control sleeve is mounted internally of the impeller housing for movement into a gap between the impeller member and the stator for controlling the torque absorbed by the retarder unit.

Patented March 30, 1971
3,572,480
3 Sheets-Sheet 1
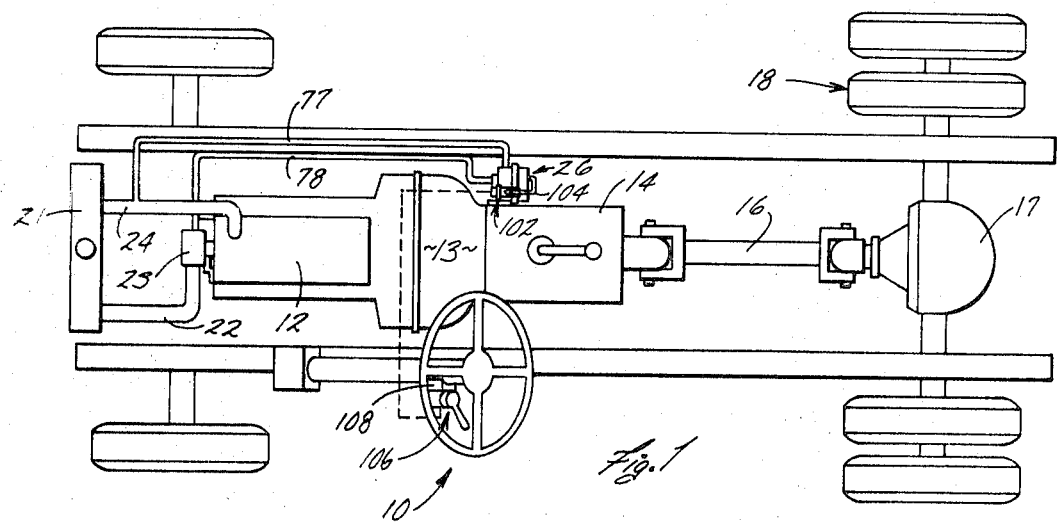
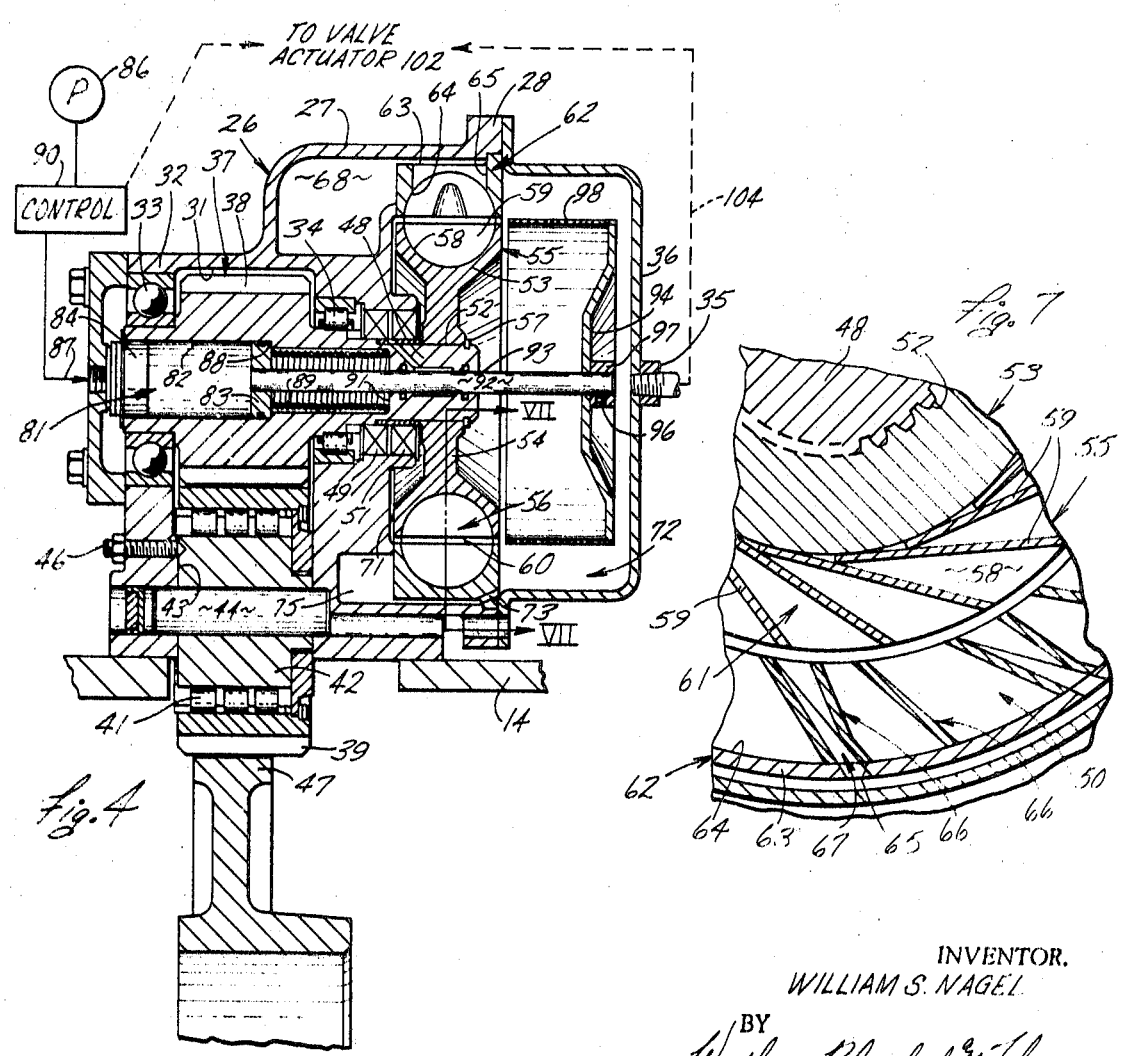
INVENTOR.
WILLIAM S. NAGEL
BY
Woodhams, Blanchard & Flynn
ATTORNEYS

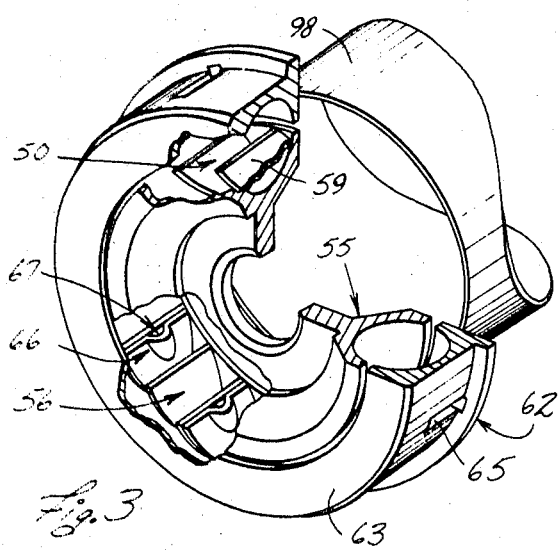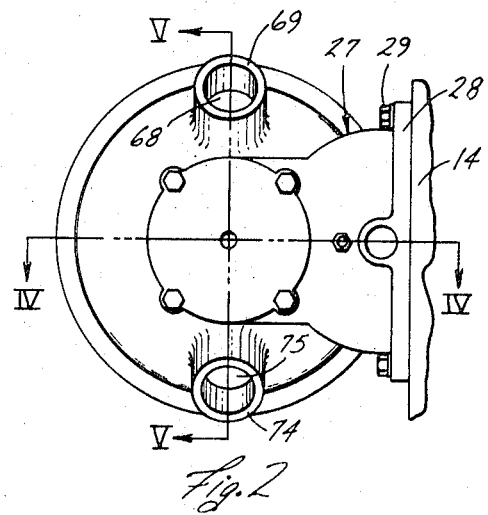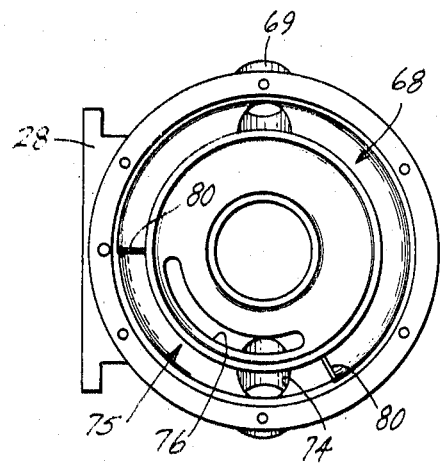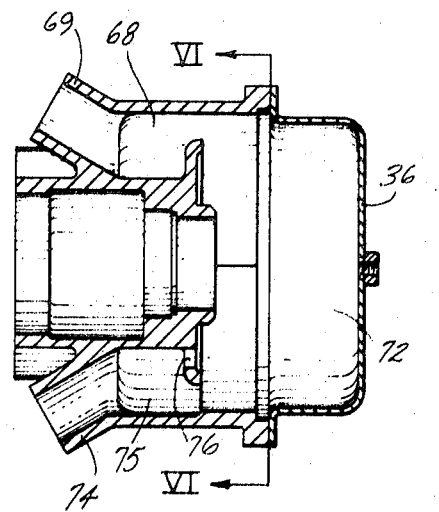
INVENTOR.
WILLIAM S. NAGEL
BY
Woodhams, Blanchard & Flynn
ATTORNEYS

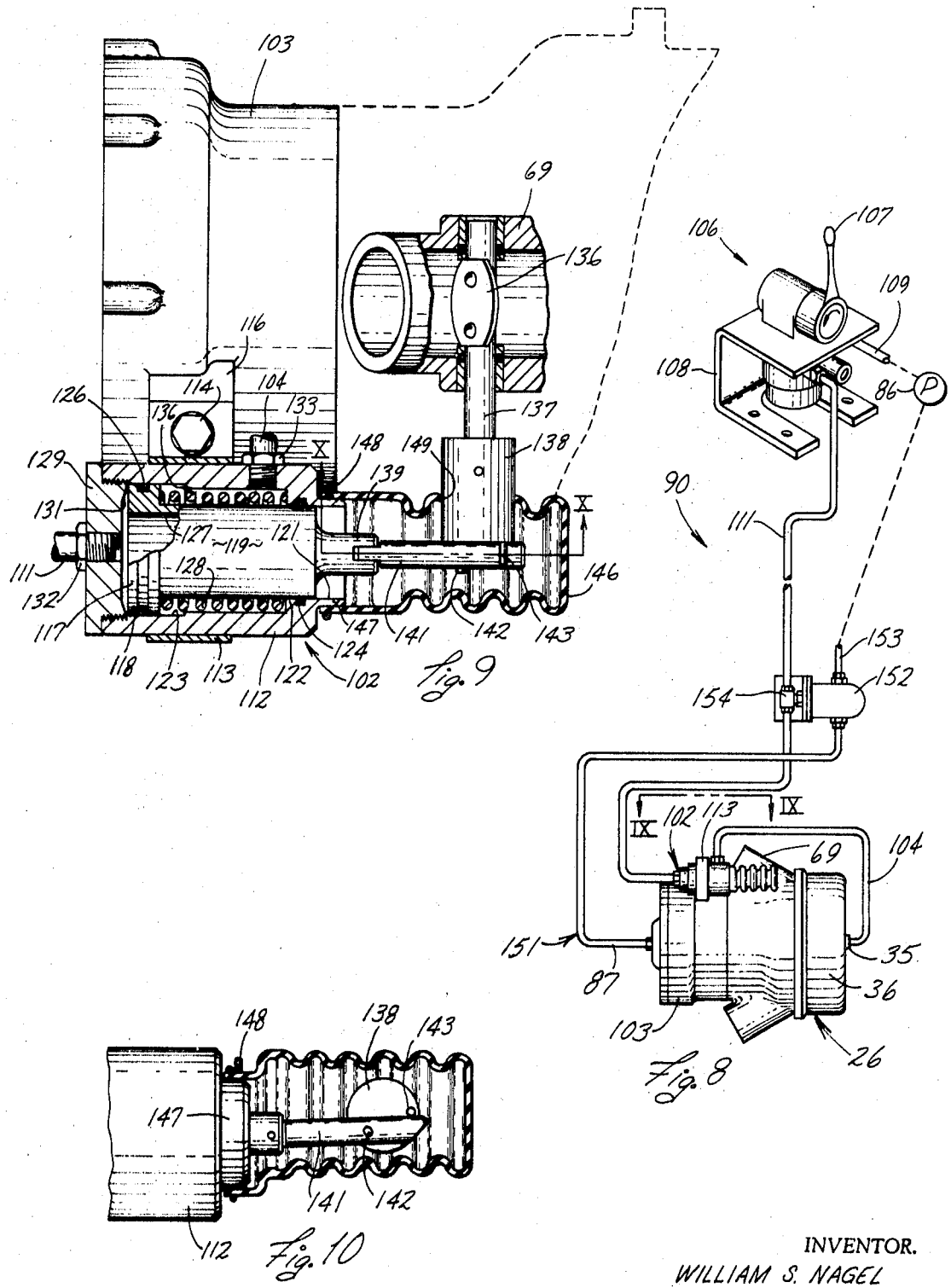

TRANSMISSION-DRIVEN RETARDER WITH FLUID-OPERATED BLOCKER AND INLET VALVE

FIELD OF THE INVENTION

This invention relates to a speed retarder unit for motor vehicles and relates particularly to one intended for connection ahead of at least a portion of the transmission gears of the vehicle and utilizing the vehicle cooling fluid for its energy absorption medium and having an internal mechanism for controlling the magnitude of retarding torque generated by such unit.

BACKGROUND OF THE INVENTION

The usefulness of an effective and efficient energy absorbing unit for motor vehicle use supplementary to the braking system thereof has been understood for a number of years and many devices have been proposed and utilized for this purpose. Briefly, however, it may be said that speed retarder units are normally turbine devices connectable to the drive wheels of an automotive vehicle, usually by being connectable to some portion of the drive line of the vehicle, and are provided with means for absorbing energy from the rotor of said turbine and dissipating same as heat to the atmosphere.

More specifically, it has been understood for many years that the use solely of brakes for controlling the speed of a vehicle in hilly or mountainous terrain often overheats the linings and drums of said brakes and same will at best last for only a short period. This problem has long been commonly met in passenger car travel by connecting the engine in a substantially unpowered condition to the drive wheels of the vehicle in order to use the drag of the engine for assisting the brakes and preventing excessive vehicle speed.

In extending this same concept to heavier vehicles, such as trucks, the engine drag has often been found insufficient and has therefore been replaced or supplemented by retarder units of a number of different designs. Most of these retarder units have been installed in the drive line of the vehicle, usually between the transmission and the differential gearing of the vehicle and in series with a suitably shortened drive shaft. In addition, at least one retarder unit has been designed for placement at the forward end of the vehicle transmission as an integral part thereof and operating in conjunction with the input gears of the transmission.

These units, insofar as I am aware, operate satisfactorily but they still present certain problems which it is the purpose of the present invention to correct. For example, where a unit is placed anywhere between the transmission and the drive wheels of the vehicle, it will run relatively slowly when the vehicle is going at a relatively slow speed. Since the effective braking torque developed by a turbine-type retarder increases as an exponential function of its speed, a retarder unit that is large enough for low-speed operation is excessive for high-speed operation, or conversely, a retarder unit that is correctly designed for higher speed operation is totally inadequate when operated at low speeds. Thus, means should be provided for driving the retarder at a suitably high speed through a high ratio when the vehicle is going slowly but which will drive same at approximately the same speed through a low ratio when the vehicle is going rapidly.

To meet this problem, it has been proposed to place the retarder ahead of the transmission gearing, or at least ahead of the portion of the transmission gearing, whereby the transmission gears themselves provide the desired ratio above mentioned. Thus, at high speeds, with the transmission in direct drive the retarder unit will be driven at a speed sufficient for its effective operation and at low vehicle speeds the transmission may be placed in its low gear condition and the retarder unit is still driven at a sufficiently high speed to be effective.

However, in all of these units, the problem of withdrawing the absorbed energy from the unit has required special consideration. Where the units have been placed behind the transmission, they have normally utilized oil as the energy absorbing medium and this has required a suitable heat exchanger for cooling the oil and usually a pump for insuring circulation of the oil between the retarder unit and the heat exchanger. All of this has added expense to the apparatus as well as inconvenience in the installation of same.

In the unit built as an integral part of, but at the forward end of, a transmission, the transmission lubricant is available for energy absorbing purposes but this still requires means for cooling said lubricant and, hence the necessity for a special heat exchanger, pump and appropriate connections is still present.

It has been suggested to avoid the necessity for a special heat exchanger and pump by connecting the retarder to the engine coolant system whereby to use the engine radiator and coolant pump for si dissipating the heat developed in the retarder. However, this is not feasible for obvious reasons where the retarder unit is built into the transmission as an integral part thereof. Where the retarder unit is in the drive line of the vehicle, the connection to the engine radiator is mechanically feasible but the use of engine coolant, which is usually water, requires that the retarder unit be made of rust-resisting materials and in view of the relatively large size required of the retarder where it is placed in the drive line as above pointed out, the cost of same becomes excessive.

My U.S. Pat. No. 3,291,268, issued Dec. 13, 1966, discloses the utilization of a turbine-type retarder mechanism connected to the power takeoff connection to the transmission at a point having a least a pair of ratio gears between the power takeoff and the output shaft of the transmission. Furthermore, my patent also discloses the use of the vehicle engine coolant system for dissipating the heat developed in the retarder. While the device of my patent is effective and reliable, in a continuing effort to improve the product, I have addressed my attention particularly to reducing the number of parts involved in control portions of the system. This has been accomplished by utilizing a modified retarder unit and in connection therewith eliminating the external control, namely the clutch which effects an "on-off" control of the retarder and replacing same with inexpensive internal controls.

Accordingly, the objects of the invention include:

1. To provide a retarder device for automotive use adaptable for use with the coolant system of the vehicle engine and connectable to the vehicle drive system at a point therein ahead of at least one pair of the transmission ratio gears. 2. To provide a vehicle retarder, as aforesaid, which is sufficiently small as to be capable without excessive cost of being manufactured of relatively expensive, water-resistant materials whereby to enable it to be connected to the vehicle engine cooling system.

3. To provide a vehicle retarder system, as aforesaid, wherein the retarder can be connected as an accessory after the manufacture of the vehicle has otherwise been completed.

4. To provide a vehicle retarder system, as aforesaid, wherein the additional mechanism required is small and inexpensive, may be applied to an otherwise completed vehicle quickly, easily and by mechanics of only ordinary training and skill and wherein the maintenance required to keep said retarder system in good operating condition is minimal.

5. To provide a retarder system, as aforesaid, wherein the engine cooling radiator may function as the heat exchanger for dissipating unwanted energy from the retarder during the period in which the service of said radiator to the engine is not needed.

6. To provide a retarder unit which can be rendered operative or inoperative as desired with only simple controls.

7. To provide a retarder unit, as aforesaid, wherein the device for effecting an on-off control is mounted internally of the unit.

Other objects and purposes of the invention will be apparent to persons acquainted with apparatus of this general type upon reading the following disclosure and upon inspection of the accompanying drawings, in which:

FIG. 1 is a schematic plan view of an automotive vehicle showing the manner of installing the retarder unit embodying the invention;

FIG. 2 is an elevation of the retarder unit as seen from the side thereof which is forward with respect to the direction of vehicle operation;

FIG. 3 is a perspective view of the impeller member, the stator and the control sleeve;

FIG. 4 is a sectional view taken along the line IV–IV of FIG. 2;

FIG. 5 is a sectional view taken along the line V–V of FIG. 2;

FIG. 6 is a sectional view taken along the line VI–VI of FIG. 5;

FIG. 7 is an enlarged sectional view taken along the line VII–VII of FIG. 4;

FIG. 8 is a diagrammatic view of a control system operable with the retarder unit of FIG. 4;

FIG. 9 is an enlarged fragmentary partially broken sectional view substantially as taken on the line IX–IX of FIG. 8; and FIG. 10 is a central cross-sectional view substantially as taken on line X–X of FIG. 9.

SUMMARY OF THE INVENTION

The objects and purposes of the invention are met by providing a retarder system on a land vehicle wherein the retarder system utilizes the vehicle engine cooling system for cooling the working fluid of the retarder, wherein the retarder is connected to the power takeoff connection on the transmission at a point having at least one pair of ratio gears between the power takeoff and the output shaft of the transmission, and wherein the amount of torque absorbed by the retarder unit is controlled by a control sleeve mounted internally of the retarder unit.

DETAILED DESCRIPTION

In the following description, certain terms will be used solely for convenience in description and will have no limiting significance. For example, the terms "upwardly" and "downwardly" will refer to directions taken with respect to the normal position of use of the retarder as shown in FIG. 2. The terms "rightwardly" and "leftwardly" will be used with reference to particular drawings. The terms "inwardly" and "outwardly" will refer to directions toward and away from the geometric center of the apparatus. Said terms will also include derivatives of the words above specifically mentioned as well as other words of generally similar import.

Referring first to FIG. 1, there is shown an automotive vehicle 10 of any type having a frame 11, an engine 12 driving through a clutch 13 and a transmission 14 to a propeller shaft 16 and thence through a differential 17 to drive wheels indicated generally at 18 and 19. A heat exchanger, or radiator, 21 is indicated as connected conventionally at the forward end of the vehicle and connected from its lower end by a conduit 22 to a water pump 23 which discharges into the lower end of the engine water jacket in the usual manner. A conduit 24 connects the upper end of the engine water jacket to the upper end of the radiator 21.

All of the foregoing is conventional and has been illustrated solely to assist in understanding the invention.

Turning now to the retarder unit itself, the same being indicated generally at 26 in FIG. 1 and, as more fully illustrated in FIGS. 2 through 7, inclusive, consists of a housing 27 having suitable means, as a flange 28, for mounting said unit by machine screws 29 (FIG. 2) to the side of the transmission 14. The housing 27 has a rotor chamber 31 (FIG. 4) therewithin and includes a rotor bearing support portion 32 arranged for supporting rotor bearings 33 and 34. The bearings are of any conventional type and are supported in any convenient manner which will be readily apparent to those skilled in the art and therefore needs no detailing. A cover 36 closes the chamber 31 and has a fitting 35 connecting a line 104 through the wall thereof.

A rotor 37 is supported by the bearings 33 and 34 and carries peripherally formed thereon suitable teeth 38 arranged for driving engagement with any driving device, here an idler gear 39. The idler gear 39 is carried by rollers 41 on an inner bearing race member 42 which is received into a drive chamber 43 in the housing 27. The inner bearing race member is held in place by a pin 44 and held against rotation by a suitable screw 46. The idler gear 39 meshes with any conveniently available gear 47 within the transmission housing, such as the head gear at the forward end of the transmission countershaft or a gear in the power takeoff train.

Extending from the rotor 37, which carries the teeth 38 in this embodiment, is a portion 48 of reduced diameter which extends past an oil seal 49 and a water seal 51 and terminates in a splined portion 52. The turbine rotor 53 is fastened to the splines 52 and consists of a center plate 54 and blade means 55. A snapring 57 is received in an annular groove in the splines and serves to prevent an axial movement of the turbine rotor 53 relative to the extension 48. The blade means 55 are defined by a radially outwardly facing annular trough 58 in the radially outer surface of the rotor 53. In this particular embodiment, the trough 58 is semicircular in cross section. However, it is recognized that other smooth and continuously curved surfaces such as semielliptical surfaces can be utilized without destroying the operativeness of the retarder unit. A plurality of blades 59 are circumferentially spaced in the trough 58 around the rotor 53. As is illustrated in FIG. 7, the blades 59 are inclined with respect to the radius of the rotor 53, preferably at an angle of 45°. However, the blades 59 can be mounted at different angles without appreciably destroying the operativeness of the retarder unit. Generally, the blades can be mounted at an angle with respect to the radius within the range of about 30° to about 60°. The spacing between the blades 59 define pockets 61.

A stator 62 of the retarder unit comprises an annular outer member 63 having a radially inwardly facing trough 64 radially aligned with the outwardly facing trough 58 of the rotor 53. The stator 62 is suitably fastened, such as by welding, to the housing 27. The stator 62 is spaced radially outwardly from the rotor 53 to define a gap 60.

A plurality of blades 66 are secured in the trough 64 and are circumferentially spaced therein. Alternating ones of the blades 66 have passageways through the center thereof of which one is indicated at 67 at FIG. 7. Openings 65 are provided through the outer surface of the annular outer member 63 which openings communicate with the passageways 67 through the center of appropriate ones of the blades 66. The blades 66 are inclined with respect to the radius of the annular outer member 63 at an angle of 45°. It is recognized, however, that the blade angle could be other than 45° and not greatly disturb the operativeness of the retarder unit. It is contemplated that the blade 66 could be mounted at an inclination with respect to the radius of the annular outer member 63 at an angle in the range of about 30° to about 60°. The spacing between the blades 66 define pockets 50. The pockets 50 and the pockets 61 define a working zone 56 in which the working fluid circulates to cause an absorption of torque by the retarder unit.

The stator has an annular inlet manifold 68 (FIGS. 5 and 6) arranged adjacent thereto, which manifold communicates through the stator by the plurality of openings 65 and passageways 67 formed therein. A conduit 69 is formed in the housing 27 and connects with the interior of the annular manifold 68. Fluid enters the turbine through the conduit 69, manifold 68, thence through the several openings 65 and nozzles 67 and against the flow aligners or blades above mentioned. Braking fluid then discharges through the gap 60 into a chamber 71 and a chamber 72 in the cover 36. The chamber 72 in the cover 36 communicates through passageways 73 (FIG. 4) to an outlet manifold 75 and thence the outlet conduit 74. The chamber 71 communicates through an elongated slot 76 (FIGS. 5 and 6) to the outlet manifold 75 and thence to the outlet conduit 74. The inlet manifold 68 is separated from the outlet manifold 75 by a pair of walls 80 (FIG. 6).

In this device, the liquid braking fluid relationships of the rotor 53 and the annular outer member 63 are such that they will act as a pump whereby the liquid braking fluid is drawn into the system from the manifold 68 through the openings 65 and the inlet passageways 67 and into the working zone 56. The blades 59 and 66 align and direct the flow of fluid thereby causing same to absorb energy with maximum efficiency from the mechanical means driving the rotor and the liquid is then expelled through the outlet 74.

Turning now to the remainder of this system, the outlet 74 is connected with a conduit 77 either flexible or rigid which is in turn connected to the inlet side of the radiator 21, such as by being connected to the high temperature engine conduit 24. The low temperature side of the radiator, such as a portion of the outlet of the pump 23, is connected by a conduit 78 to the inlet 69 of the retarder unit 26 and the circuit is complete.

The rotor 37 has an opening 81 through the center thereof. The opening 81 has a portion 82 which slideably receives a piston 83 therein. A plug 84 is provided in the left end (FIG. 4) of the opening 81 and serves to limit the leftward movement of the piston 83. The plug 84 has an opening (not shown) through the center thereof which communicates with a source 86 of pressurized fluid through a conduit 87 and control 90. The rightward movement of the piston 83 is limited by a shoulder 88 which projects radially inwardly at the rightward end of the portion 82. A spring means 89 is mounted between the piston 83 and a bottom 91 of the opening 81 and serves to urge the piston 83 leftwardly. A rod 92 is secured to the piston 83 and extends rightwardly therefrom through the spring 89 and out of the right end of the rotor 37 through an opening 93 and terminates short of the cover 36. A radial flange 94 having a hub 97 is secured by a setscrew 96 to the rod 92. A cylindrical sleeve 98 is secured at the rightward edge thereof to the radially outer edge of the flange 94 and extends leftwardly therefrom. The radially outer diameter of the sleeve 98 is slightly less than the radially inner diameter of the annular outer member 63. The inner diameter of the sleeve 98 is slightly greater than the radially outer diameter of the rotor 53. Thus, an axial movement of the piston 83 and rod 92 will cause a corresponding movement of the sleeve 98 into the gap 60 between the rotor 53 and the annular outer member 63 to control the amount of torque absorbed by the retarder unit.

The control of fluid supplied through the inlet port 69 of the retarder may be by any convenient means, of which one particularly advantageous example is illustrated in FIGS. 8—10 and described hereinafter.

A control valve actuator 102 (FIG. 8) is mounted upon the rightward end portion 103 of the retarder 26 adjacent the inlet conduit 69. The control actuator 102 (FIG. 9) includes a cylindrical housing 112 which is rigidly affixed by means of a strap 113 and screws, one of which is indicated at 114, to a buttress 116 on the periphery of the end portions 113. A piston 117 is reciprocable within a central opening 118 of the cylindrical housing 112. An elongated piston rod 119 is preferably integral with the piston 117 and extends rightwardly therefrom. A passage 121 communicates with the rightward end of the central opening 118 and is defined by an annular flange 122 which extends radially inwardly from the rightward end of the housing 112. The piston rod 119 snugly but slideably extends through the passage 121.

The piston rod 119 defines an annular liquid chamber 123 in the central opening 118 between the annular flange 122 and the piston 117. A sealing device, here an O-ring 124, is seated within a suitable annular groove in the passage 121 for bearing against the periphery of the piston rod 119 to seal the rightward end of the annular chamber 123. The periphery of the piston head 117 is annularly grooved for receiving a sealing device, here an O-ring 126, which bears on the wall of the central opening 118 for sealing the leftward end of the chamber 118. In the particular embodiment shown, the piston 117 has a leftwardly opening central recess 127. A coil spring 128 substantially coaxially surrounds the piston rod 119 and is compressible between the piston head 117 and the annular flange 122 for urging the piston 117 leftwardly in the cylindrical housing 112. A cap 129 is threaded into the leftward end of the cylindrical housing 112 and defines with the piston 117 an air chamber 131. A fitting 132 connects a line 111 through the cap 129 to the air chamber 131. A fitting 133 connects the line 104 through the peripheral wall of the cylindrical housing 112 to the liquid chamber 123 adjacent the rightward end thereof. Thus, the turbine chamber 72 is connected to the liquid chamber 123 through the line 104. The central opening 118 is provided with a leftwardly facing step 134 between the fitting 133 and the cap 129 for limiting rightward movement of the piston 117.

A butterfly valve plate 136 is disposed within the inlet conduit 69 for opening and closing the conduit. The plate 136 is affixed to a rotatable shaft 137 which extends substantially diametrically through the inlet conduit 69 substantially toward the central axis of the control cylinder 102 adjacent the rightward end (FIG. 9) of the cylinder. A cylindrical block 138 affixed to the end of the shaft 137 lies adjacent the central axis of the control cylinder 102.

A preferably integral and coaxial stub 139 extends rightwardly from the piston rod 119 and is reduced in diameter with respect thereto. The end of the stub 139 pivotally supports the leftward end of an extension rod 141. A pin 142 (FIG. 10) is affixed eccentrically to the end face of the block 138 and pivotally engages the intermediate portion of the extension rod 141. An eccentrically located stop pin 143 axially projects from the radial face of the block 138 and bears upon the upper surface of the rightward end of the extension rod 141 to prevent clockwise (as seen in FIG. 10) movement of the plate 136 from its closed position. A flexible boot 146 telescopes over an axial flange 147 on the rightward end of the housing 112. The boot 146 is fixed to the flange 147 by any convenient means, here a conventional retaining ring 148. The boot 146 extends rightwardly from the housing 112 and loosely surrounds the stub 139 and extension shaft 141. The block 138 extends through a sideward opening 149 in the boot 146. The boot 146 protects the above-mentioned linkage between the piston rod 119 and shaft 136 against dirt.

The control 90 for the retarder includes, in one particular embodiment, a fluid pressure regulating valve 106 having a manually operable handle 107 and is preferably mounted by any convenient means such as the mounting member 108 on the vehicle within reach of the vehicle operator. One side of the regulating valve 106 connects to a line 109 fed by the source of pressurized fluid 86, preferably air. A line 111 connects the other side of the valve 106 to the control cylinder 102. Thus, manipulation of the handle 107 of the regulating valve 106 will vary the air pressure supplied by the source 86 to the control cylinder 102.

The control system 90 is further arranged for use with a fluid, preferably air controlled, actuating system 151 for actuating the sleeve 98. The sleeve actuating system 151 includes an air-actuated displacement device which, in the present embodiment of the invention, comprises the opening 81 (FIG. 4) and the piston 83 slideable therein. The air feed line 87 connects through the plug 84 to the leftward side of the piston 83 to supply air under pressure thereto for moving the piston inwardly against the spring 89. The air line 87 is connected to a pressure valve 152. The pressure valve 152 is fed by the source of pressurized air 86 through a line 153. The line 111 connects to the pressure valve 152 by a fitting 154, the pressure valve 152 allowing flow therethrough from source P and line 153 to the line 87 and hence to the retarder end portion 103 upon the appearance of an air pressure of predetermined value in the line 111. Conversely, the pressure valve 152 shuts off air pressure from the source 86 to the retarder end portion 103 when the regulating valve 106 is turned off and the pressure on the line 111 falls below its normal operating range. The actuation of the retarder 26 is thus also automatically accomplished by manipulation of the regulating valve 106.

OPERATION

The operation of the device embodying the invention will be described in detail hereinbelow for a better understanding of the invention.

The gear 47 is assumed to be continuously operating so that the retarder unit is rendered operative or inoperative at the will of the operator by the suitable control 90 which controls the pressure applied to the left side of the piston 83 (FIG. 4) and the left side of the piston 117 (FIG. 9). The apparatus is placed in condition for operation by a manipulation of the handle 107 on the regulating valve 106. This will effect a controlled application of pressure to the pressure valve 152 through the fitting 154. This will cause an application of air pressure from the source 86 through the lines 153 and 87 to the left side of the piston 83 to effect a movement of the piston 83 and sleeve 98 rightwardly to the position illustrated in FIG. 4 to render the rotor operative. The butterfly plate 136 is normally held in its closed position by the leftward urging of the piston 117 by the spring 128. The pressure in the line 111 required to initiate compression of the spring 128 by the piston 117 is preferably greater than that required to actuate the pressure valve 152 and sleeve 98. Thus, the sleeve 98 will be retracted before the initial opening of the butterfly plate 136 occurs. Further opening of the regulator valve 106 sufficiently pressurizes the air chamber 131 via line 111 as to cause an initial rightward displacement of the piston 117. As a result, the butterfly plate 136 pivots (in a counterclockwise direction as seen in FIG. 10) to allow fluid to flow at a restricted rate into the retarder 26 through the inlet conduit 69. Since the retarder 26 is at all times mechanically connected to the vehicle transmission admission of working fluid into the retarder chamber 68 and thence into the rotor zone will provide fluid means on which the relatively rotatable parts can work and energy will be absorbed in an amount roughly proportional to the amount of liquid admitted to the retarder. Thus a retarding torque is imposed onto the vehicle. A continued opening of the regulator valve 106 results in a smooth increase from zero to maximum of the retarding torque exerted by the retarder 26.

Were the butterfly plate 136 controlled only by the regulator valve 106, fluid pressure in the turbine chamber 72 and in the liquid chamber 123 would tend to increase with increasing vehicle speed thereby producing excessive retarding torque at high engine speeds and/or insufficient torque at low speeds. The present control system overcomes this tendency by reducing torque at high speeds while maintaining useful torque output at low speeds so that torque output is substantially of the same magnitude at high and low speeds. This result is achieved in the present system by using the aforementioned tendency for pressure in the turbine chamber 72 to increase with an increase in speeds. More specifically, the line 104 maintains liquid in the annular liquid chamber 123 of the control cylinder 102 at the same pressure as the liquid in the turbine chamber 72. The pressurized liquid in the liquid chamber 123 acts with the spring 128 to resist rightward movement of the piston 117 urged by the air pressure in the air chamber 131 and, hence, opening of the butterfly plate 136. Thus, at high engine speeds, the piston 117 will open the butterfly plate at a lesser amount than would normally be the case in the presence of a given air pressure in the air chamber 131. As a result, less liquid will be admitted to the retarder past the butterfly plate 136 at high engine speed, the resulting retarding torque of the retarder 26 thereby being reduced.

At low engine speeds, the liquid in the turbine chamber 72 and the liquid chamber 123 is relatively low and the air pressure on the leftward end of the piston 117 is chiefly opposed by the spring 128. The butterfly plate 136 may therefore be opened more by a given air pressure in the air chamber 131 for admitting more liquid to the turbine chamber. This tends to increase retarder torque output at low speeds so the retarder torque output will be substantially similar at high and low engine speeds.

Increased opening of the regulating valve 106 increases the air pressure in the air chamber 131 so that the piston 117 opens the butterfly plate 136 and so increases retarding torque. The rightward limit of the piston 117 corresponds to the fully opened position of the butterfly plate 136.

When the butterfly plate is moved to an opened position, the pump 23, which continuously supplies fluid to the retarder unit when the engine 12 is in operation, will cause the working fluid to flow into the conduit 69 and then into the manifold 68. The working fluid within the manifold 68 will flow into the working zone 56 to smoothly circulate within the pockets 50 and 61 to cause the working fluid to absorb torque. It will then exit from the working zone through the gap 60 into the chambers 71 and 72. The working fluid in the chamber 71 will flow through the elongated slot 76 and into the outlet 74. The working fluid in the chamber 72 in the cover 36 will flow through the openings 73 into the outlet manifold 75 and thence to the outlet conduit 74. The now hot fluid will pass through the conduit 77 into the conduit 24 and into the hot side of the radiator 21 for cooling.

It has been assumed in the foregoing discussion that the working fluid has been a liquid, namely the cooling liquid used in the cooling systems of vehicles. This liquid is usually water. Since the liquid in the troughs 58 and 64 is normally smoothly circulating at a very high velocity, the introduction of the sleeve 98 into the gap 60 between the inner rotor member 53 and the annular outer member 63 may create cavitation in the system which an be damaging to the left edge of the sleeve 98. Thus, it is preferable that the sleeve 98 be permitted to move quickly into and out of the gap 60. This is accomplished by the provision of the pressure source 86 which causes the piston 83 to move quickly rightwardly when the source 86 is energized and to move the sleeve 98 out of the gap 60. On the other hand, upon decreasing the pressure from the source 86 below a predetermined minimum by operation of the handle 107 on the regulator valve 106, the sleeve 98 will move quickly into the gap 60 under the urging of the spring 89 to turn off the retarder.

Although a particular preferred embodiment of the invention has been disclosed in detail for illustrative purposes, it will be recognized that variations of modifications of the disclosed apparatus, including the rearrangement of parts, lie within the scope of the present invention.

I claim:

1. Means for retarding the speed of an automotive vehicle having an engine cooling system, ground engaging wheels and a transmission including a housing and gears normally shiftable to high ratios at low vehicle speeds and low ratios at high vehicle speeds and having an externally accessible shaft connected to said transmission at a point having at least one pair of ratio gears between said shaft and the output of said transmission and means operatively connecting said wheels and said transmission, the combination comprising:

an impeller housing and a first bladed element mounted therein and arranged nonrotatably with respect thereto;

an impeller rotatably mounted within said impeller housing, said impeller having a second bladed element spaced from said first bladed element and defining therewith an energy absorbing device when a fluid is supplied to said bladed elements;

means driving said second bladed element from said shaft;

means mounting said impeller housing rigidly with respect to said transmission housing;

sealing means isolating the interior of said impeller housing from the interior of said transmission housing;

controllable blocking means interiorly of said housing and arranged for entering (at the will of an operator) into the spacing between said first and second bladed elements for controlling the degree of coupling therebetween;

motor means for selectively moving said blocking means into and out of said spacing to thereby selectively vary the energy absorbing capacity of said device;

operator controlled valve means;

means operative in response to selective actuation of said valve means by said operator to selectively actuate said motor means to move said blocking means into and out of said spacing; and inlet and outlet ports for said impeller housing and conduit means connecting said inlet port to the low temperature side of the engine cooling system and other conduit means connecting said outlet port to the high temperature side of said engine cooling system whereby the energy absorption fluid for said impeller is circulated independently of conditions within said transmission housing.

2. The device defined in claim 1, wherein said second bladed element is concentric with and radially spaced inwardly from said first bladed element.

3. The device defined in claim 2, wherein said first bladed element is mounted on and affixed directly to the interior of said housing.

4. The device defined in claim 1, wherein said externally accessible shaft is the power takeoff.

5. The device defined in claim 1, including second valve means for controlling the flow of energy absorbing fluid to said retarding means.

6. The device defined in claim 5, including a first source of control fluid;

a second source of control fluid for supplying control fluid under pressure;

control means for controlling said second valve means and in turn actuated in one direction by first pressure means connected from within said energy absorption device and in the opposite direction by second pressure means directed from said second source; and whereby flow of fluid from said second source can control the level of retarder torque output through said control means while said first pressure means prevents excessive retarder torque output at high engine speeds while allowing useful torque output at low engine speeds.

7. The device defined in claim 6, wherein said control means comprises a control cylinder 102 including a reciprocable piston 117 defining therewith and separating first 123 and second 131 cylinder chambers;

said first pressure means includes conduit means 104 connected between said first cylinder chamber and said energy absorbing device and said second pressure means includes a regulating valve 154 connected between said second source and said second cylinder chamber 131;

said control means further includes linkage for connecting said piston 117 to said second valve means 136 so that movement of said piston in one direction opens said second valve means and return of said piston closes said second valve means;

spring means 128 for urging said piston in a direction for closing said second valve means 136, an increase in pressure in said second cylinder chamber 131 tending to move said piston to open said second valve means and an increase in pressure in said first cylinder 131 chamber tending to act with said spring to move said piston for closing said second valve means; and whereby an increase in pressure in said energy absorbing device tends to close said second valve means.

8. The device defined in claim 7, wherein said second valve means comprises a butterfly valve mounted on said retarding means for controlling the flow of fluid thereto from said first source and having a motion traversing continuously between a closed and open position, said butterfly valve being mounted on a shaft terminated in a block, said block having an eccentrically mounted pivot thereon;

said linkage includes an extension joining said piston to said pivot whereby reciprocation of said piston causes rotation of said shaft, a portion of said extension extending beyond said pivot;

said block includes a second eccentric pin for engaging said portion to prevent pivotal movement of said butterfly valve from said open position past said closed position;

said control cylinder includes a shoulder for engaging said piston and preventing movement thereof in one direction thereof and therepast to prevent motion of said butterfly valve from said closed position past said open position; and whereby said butterfly valve operates in bounded manner as a result of movement of said piston.

9. Means for retarding the speed of an automotive vehicle having an engine cooling system and ground engaging wheels, the combination comprising:

an impeller housing and a first bladed element mounted therein and arranged nonrotatably with respect thereto;

an impeller rotatably mounted within said impeller housing, said impeller having a second bladed element arranged concentrically within and radially spaced from said first bladed element and defining therewith an energy absorbing device when a fluid is supplied to said bladed elements;

a shaft journaled in said housing for rotation about an axis generally normal to the plane of said impeller, said shaft being fixed adjacent one end to said impeller and having an axial bore therewithin;

piston means slideably disposed within said bore and including a rod member extending outwardly through said one shaft end to a location beyond said impeller plane;

means driving said shaft and thereby said impeller in response to rotation of said wheels;

means mounting said impeller housing rigidly with respect to the frame of said vehicle;

a cylindrical sleeve carried by the free end of and concentric with said rod member and arranged to move selectively into and out of the spacing between said first and second bladed elements in response to reciprocation of said piston means in said bore whereby to selectively vary the energy absorbing capacity of said device;

means controllable by a vehicle operator to selectively reciprocate said piston means; and inlet and outlet ports for said impeller housing and conduit means connecting said inlet port to the low temperature side of said engine cooling system and other conduit means connecting said outlet port to the high temperature side of said engine cooling system whereby energy transferred to said fluid from said impeller is caused to dissipate through the engine cooling system.

10. Means for retarding the speed of an automotive vehicle having an engine cooling system, ground engaging wheels and a transmission including a housing and gears normally shiftable to high ratios at low vehicle speeds and low ratios at high vehicle speeds and having an externally accessible shaft connected to said transmission at a point having at least one pair of ratio gears between said shaft and the output of said transmission and means operatively connecting said wheels and said transmission, the combination comprising:

an impeller housing and a first bladed element mounted therein and arranged nonrotatably with respect thereto;

an impeller rotatably mounted within said impeller housing, said impeller having a second bladed element concentric with and radially spaced from said first bladed element and defining therewith an energy absorbing device when fluid is supplied to said bladed elements;

means driving said second bladed element from said shaft;

means mounting said impeller housing rigidly with respect to said transmission housing;

sealing means isolating the interior of said impeller housing from the interior of said transmission housing;

controllable blocking means interiorly of said housing and arranged for entering into the spacing between said first and second bladed elements for controlling the degree of coupling therebetween;

resilient means normally urging said controllable means into said spacing for preventing fluid flow therebetween;

means controllable by an operator for overcoming said resilient means for moving said controllable means out of said spacing to thereby permit said first and second bladed elements to cooperate with each other through said fluid for absorbing energy from said wheels; and inlet and outlet ports for said impeller housing and conduit means connecting said inlet port to the low temperature side of the engine cooling system and other conduit means connecting said outlet port to the high temperature side of said engine cooling system whereby the energy absorption fluid for said impeller is circulated independently of conditions within said transmission housing.

11. A torque transfer apparatus comprising:

an impeller housing and a first bladed element mounted therein and arranged nonrotatably with respect thereto;

an impeller rotatably mounted within said impeller housing, said impeller having a second bladed element arranged concentrically within and radially spaced from said first bladed element and defining therewith an energy absorbing device when a fluid is supplied to said bladed elements;

a shaft journaled in said housing for rotation about an axis generally normal to the plane of said impeller, said shaft being fixed adjacent one end to said impeller and having an axial bore therewithin;

piston means slideably disposed within said bore and including a rod member extending outwardly through said one shaft end to a location beyond said impeller plane; and a cylindrical sleeve carried by the free end of and concentric with said rod member and arranged to move selectively into and out of the spacing between said first and second bladed elements in response to reciprocation of said piston means in said bore whereby to selectively vary the energy absorbing capacity of said device.